United States Patent [19]

Bober

[11] Patent Number: 4,905,783
[45] Date of Patent: Mar. 6, 1990

[54] VEHICULAR CONTROLLER WITH DIFFERENTIAL WHEEL SPEED INPUT

[75] Inventor: Gregory D. Bober, Grosse Pointe Woods, Mich.

[73] Assignee: Ford Motor Company, Dearborn, Mich.

[21] Appl. No.: 323,140

[22] Filed: Mar. 13, 1989

Related U.S. Application Data

[63] Continuation of Ser. No. 66,690, Jun. 26, 1987, abandoned.

[51] Int. Cl.$^4$ .......................... B60D 5/06; B60G 17/08
[52] U.S. Cl. ..................................... 180/142; 180/141; 180/143
[58] Field of Search .............. 180/142, 141, 143, 79.1, 180/197; 364/424.01, 424.03

[56] References Cited

U.S. PATENT DOCUMENTS

| | | | |
|---|---|---|---|
| 4,313,529 | 2/1982 | Kato et al. | 188/299 |
| 4,361,346 | 11/1982 | Harris | 280/707 |
| 4,387,782 | 1/1983 | Leiber | 180/132 |
| 4,408,673 | 10/1983 | Lieber | 180/141 |
| 4,476,529 | 10/1984 | Nakamura et al. | 364/424 |
| 4,499,964 | 2/1985 | Abe et al. | 180/142 |
| 4,541,499 | 9/1985 | Yanai et al. | 180/142 |
| 4,557,342 | 12/1985 | Drutchas | 180/132 |
| 4,566,718 | 1/1986 | Kanai | 280/707 |
| 4,580,651 | 4/1986 | Adams | 180/142 |
| 4,602,695 | 7/1986 | Takeshima et al. | 180/143 |
| 4,619,338 | 10/1986 | Higashi et al. | 180/142 |
| 4,621,327 | 11/1986 | Dolph et al. | 364/424 |
| 4,621,833 | 11/1986 | Soltis | 280/707 |
| 4,629,025 | 12/1986 | Brasier et al. | 180/142 |
| 4,651,290 | 3/1987 | Masaki et al. | 364/550 |

Primary Examiner—Charles A. Marmor
Assistant Examiner—Donn McGiehan
Attorney, Agent, or Firm—Jerome R. Drouillard; Roger L. May

[57] ABSTRACT

A vehicular control with differential wheel speed input senses and operates with differential rotation of wheel speeds and uses information obtained from individual wheel speed sensors to control steering and/or suspension systems of a vehicle.

23 Claims, 3 Drawing Sheets

VEHICULAR CONTROLLER WITH DIFFERENTIAL WHEEL SPEED INPUT

BACKGROUND OF THE INVENTION

This invention relates to a vehicular controller which may be employed to control an adjustable steering gear and/or one or more adjustable suspension units. A vehicular controller according to the present invention calculates and utilizes differential wheel speed in a control algorithm.

DISCLOSURE INFORMATION

Variable assist power steering systems have been used by automotive designers to provide adaptive steering in which the amount of assistance provided to the vehicle's driver is controlled as a function of vehicle speed. U.S. Pat. Nos. 4,408,673, 4,499,964 disclose systems in which boost is provided to the steering gear only when the vehicle is standing still or moving slowly. This type of system suffers, unfortunately, from the inability to provide steering assistance at higher vehicle speeds. Although the provision of boost at high vehicle speeds is generally taught to be undesirable due to the loss of road "feel", power assist is sometimes beneficial, such as when the driver must make a sudden lane change maneuver, or when a tire deflates explosively. Thus, it would be desirable to provide a steering boost control system which is responsive to both driver inputs as well as inputs from the roadway and the vehicle.

A plurality of systems has been proposed for controlling steering boost as a function of a plurality of inputs other than vehicle speed. U.S. Pat. No. 4,602,695, for example, discloses a control device for a power steering apparatus in which an average steering angle value and average velocity value are used as inputs for power steering control.

U.S. Pat. Nos. 4,476,529 and 4,621,327 disclose systems in which vehicle velocity and detected steering torque are used as input variables to control power steering assist. U.S. Pat. No. 4,580,651, on the other hand, discloses a power assist steering system in which only the turning torque input to the steering system by the driver is sensed and fed back to the steering gear in the form of greater or lesser levels of steering assist.

U.S. Pat. Nos. 4,541,499 and 4,619,338 disclose power steering assist systems in which boost is varied as a function of vehicle speed and angular velocity of the steering wheel. These systems are unable to detect conditions in which steering assist should remain at a high level notwithstanding the absence of steering wheel movement or the presence of higher vehicle speeds. If, for example a vehicle is being driven continuously in a circle, such as is the case when a vehicle is operated in an expressway interchange, the vehicle's speed may be great and the steering wheel angular velocity may be vanishingly small. Nevertheless, a moderate level of steering boost may be desirable. The systems of the '499 and '338 patents, will be incapable of supplying boost under this condition.

U.S. Pat. No. 4,629,025 discloses a system in which steering boost is varied as a function of vehicle speed and steering wheel angular velocity and position. As with the other systems which utilize steering wheel angular velocity or position as independent variables, a separate steering wheel sensor must be provided at added cost. A vehicular controller according to the present invention may be utilized to control steering assist without the necessity of a separate steering sensor.

U.S. Pat. No. 4,387,782 discloses a system in which wheel speed sensors comprising a component part of an anti-lock brake system are employed for the purpose of signaling when the vehicle's speed has exceeded a lower threshold value. This system is thus intended to supply steering boost only at low vehicle speeds.

U.S. Pat. No. 4,651,290 discloses a system in which data from a single vehicle speed sensor is employed as a control element for various other vehicle systems including suspension and steering systems. The system of the '290 patent does not utilize data relating to the differential rotational wheel speed of more than one road wheel. Accordingly, such system cannot respond to many of the vehicular operating conditions the present system is intended to interpret and respond to.

A vehicular controller having differential wheel speed inputs according to the present invention may advantageously be employed for controlling not only a steering system, but also an adjustable suspension system. U.S. Pat. No. 4,621,833, which is assigned to the assignee of the present invention, discloses an example of a system for operating an adjustable suspension unit. The system of the '833 patent utilizes information including vehicle velocity, steering wheel angular velocity, and steering system position, inter alia, for determining the presence of appropriate conditions for shifting adjustable suspension units from soft to a firmer damping setting, and vice-versa. As with the system of the '833 patent, the present system is intended to be useful with a class of adjustable suspension units generally represented by the disclosure of U.S. Pat. No. 4,313,529, which is hereby incorporated by reference into this specification.

A plethora of automotive designers has conceived a large number of control systems for operating adjustable suspension units as a function of various operating variables. In addition to those recited previously in connection with the previous discussion of the '833 patent, supra, independent variables for controlling suspension units have included brake operation, engine throttle application, sensed lateral acceleration, predicted lateral acceleration, linear acceleration, sensed road conditions, and yet other vehicular and environmental conditions. Finally, U.S. Pat. No. 4,361,346 discloses the use of differential wheel speed as an independent variable for inhibiting the adjustment of vehicular ride height when a vehicle is cornering.

It is an object of the present invention to provide a vehicular controller which utilizes differential wheel speed as an independent variable to control boost provided to a steering gear and/or the damping or other operating characteristic of an adjustable suspension unit.

It is an advantage of the present invention that a vehicular controller according to this invention will be capable of controlling a steering system and/or a suspension unit without the necessity of a discrete steering sensor.

It is yet another advantage of the present invention that a vehicle equipped with a controller according to this invention will provide enhanced handling in the event that one of the tires of the vehicle deflates explosively.

It is yet another advantage of the present invention that a vehicle equipped with a controller according to this invention will provide enhanced handling in the event that the vehicle is operated such that the tires of the vehicle are simultaneously operated on surfaces having different coefficients of friction, such as when one side of the vehicle drops off a paved roadway onto an unpaved shoulder.

It is yet another advantage of the present invention that a vehicle equipped with a controller according to this invention will provide enhanced handling in the event that the vehicle is operated such that the tires of the vehicle are simultaneously operated on a surface having an unvarying coefficient of friction, but where the tires behave differently due to such conditions as differing inflation pressure, differences in tire quality, wheel slip, road surface quality, or other factors.

It is yet another advantage of the present invention that a vehicle equipped with a controller according to this invention will provide enhanced handling in the event that the vehicle is operated in a rapid lane change maneuver.

It is yet another advantage of the present invention that a vehicle equipped with a controller according to this invention will be able to measure the coefficient of friction of road surfaces by detecting and measuring the value of differential rotational velocity between driven and undriven road wheels.

SUMMARY OF THE INVENTION

A vehicular controller according to the present invention may be used for controlling both an adjustable steering gear and one or more adjustable suspension units. The controller preferably includes first adjustment means for controlling at least one operating characteristic of a steering gear and may include second adjustment means for controlling at least one operating characteristic of one or more adjustable suspension units. The controller further comprises sensing means for detecting the rotational velocity of at least two roadwheels of a vehicle and control means operatively associated with the first and second adjustment means and the sensing means, with the control means comprising means for determining the differential rotational velocity between the roadwheels and for controlling the first and second adjustment means according to the differential velocity. The first adjustment means may comprise either means for adjusting the force produced by the steering gear or means for adjusting the ratio of the steering gear. Alternatively, the first adjustment means may comprise means for adjusting both the steering gear's force output and ratio.

The second adjustment means may comprise means for adjusting damping forces produced by each of the suspension units or spring forces produced by each of the suspension units.

A vehicular controller according to the present invention may further comprise means for determining the absolute velocity of the vehicle as well as means for controlling first and second adjustment means according to the absolute velocity, whereby a steering gear and suspension units may be controlled not only as a function of differential rotational velocity but also as a function of absolute vehicle velocity. A vehicular controller according to the present invention may further comprise means for determining a position at which a steering gear is operated and for controlling said first and second adjustment means according to the steering gears' position, whereby the steering gear and suspension units will be controlled not only as a function of differential rotational velocity of two or more wheels, but also as a function of the position of the steering gear.

A power steering system for a vehicle having two or more wheels according to the present invention comprises a steering gear, adjustment means for augmenting the steering force produced by the steering gear, sensing means for detecting the rotational velocities of at least two of said roadwheels, and control means, operatively associated with said sensing means and said adjustment means, and comprising means for determining the differential rotational velocity between said roadwheels and for controlling said adjustment means according to said differential velocity, whereby the augmenting force provided by the adjustment means will be controlled as a function of said differential rotational velocity. A power steering system according to this invention may further comprise means for determining the rate at which the steering gear is operated and for controlling the adjustment means according to the steering gear's operational rate, whereby the augmenting force provided by said adjustment means will be controlled not only as a function of differential rotational velocity of the velocity roadwheels but also as a function of said steering gear rate. A control means utilized with the power steering system according to the present invention preferably further comprises means for determining a position at which the steering gear is operated and for controlling the adjustable means according to such position, whereby the augmenting force provided by the adjustable means will be controlled not only as a function of said differential roadwheel rotational velocity but also as a function of said steering gear position.

A power steering system according to the present invention preferably further comprises means for determining absolute velocity of the vehicle and means for operating said adjustment means according to said absolute velocity, whereby the augmenting force provided by said adjustment means will be controlled not only as a function of differential roadwheel rotational velocity, but also as a function of said absolute vehicle velocity.

A power steering system according to present invention may further comprise means for determining the position at which the steering gear is operated and for controlling the adjustment means according such position, whereby the augmenting force provided by said adjustment means will be controlled not only as a function of differential roadwheel rotational velocity but also as a function of the position of the steering gear and the absolute vehicle velocity.

In one embodiment, a power steering system for a vehicle having two or more wheels according to the present invention comprises hydraulic pump means, valve means for controlling the output of the hydraulic pump means, a hydraulic power device adapted to be connected with the hydraulic pump means so as to be supplied with pressurized hydraulic fluid for augmenting the steering force produced by the steering system, sensing means for detecting the rotational velocities of at least two of the roadwheels, and control means operatively associated with the sensing means and the valve means, with the control means comprising means for determining the differential rotational velocity between the roadwheels and for controlling the valve means according to this differential velocity, whereby the augmenting force provided by the hydraulic power device will be controlled as a function of the differential roadwheel rotational velocity. A power steering system according to this invention may further comprise means for determining the absolute velocity of the vehicle and means for operating the valve means according to an absolute velocity, whereby the augmenting force provided by the hydraulic power device will be controlled not only as a function of the differential rotational velocity but also as a function of the absolute vehicle velocity.

In another embodiment, a power steering system according to the present invention for a vehicle having two or more wheels may comprise a steering gear, adjustment means for changing the ratio of the steering gear, sensing means for detecting the rotational velocities of at least two said roadwheels and control means operatively associated with the sensing means and with the adjustment means, with the control means comprising means for determining the differential rotational velocity between the roadwheels and for operating the adjustable means according to said differential velocity, such that the ratio of the steering gear will be controlled as a function of the differential roadwheel rotational velocity. The control means according to this invention may further comprise means for determining the absolute velocity of the vehicle and means for operating the adjustment means according to the absolute velocity, such that the ratio of the steering gear will be controlled not only as a function of differential rotational velocity but also as a function of absolute vehicle velocity. According to the present invention, an adjustment means may be employed for changing both the ratio of the steering gear and for augmenting the steering force produced by the steering gear. The ratio of the steering gear and the magnitude of the augmenting force may be controlled not only as a function of the differential rotational velocity but also as a function of absolute vehicle velocity.

DESCRIPTION OF THE PREFERRED EMBODIMENTS

Figure 1:
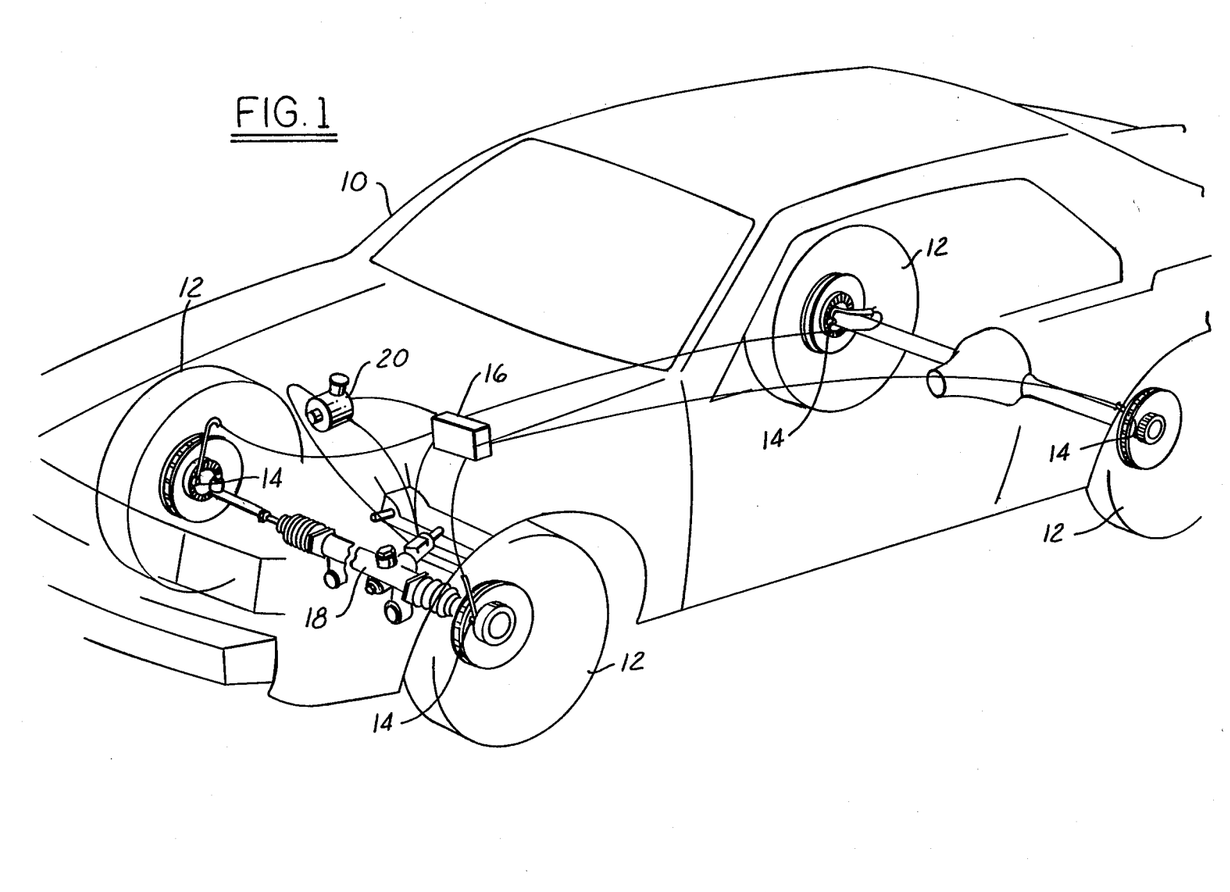
FIG. 1 is a perspective drawing of a motor vehicle incorporating the present invention. This figure shows some of the various components of the system embodying the present invention.

As shown in FIG. 1, a vehicle, 10, equipped with a controller according to the present invention includes a plurality of roadwheels, 12, in this case four in number, with each roadwheel having an associated speed sensor, 14. The details a variable reluctance electronic sensor assembly suitable for practicing the present invention and which has had previous usage in an anti-lock brake system on vehicles built by Ford Motor Company are shown in Ford Motor Company Shop Manual for 1985 model Continental and Mark VII vehicles at page 12–294. Those skilled in the art will appreciate in view of this disclosure, moreover, that other types of rotational roadwheel velocity sensors commonly in use with various types of anti-lock braking systems, or yet other types of roadwheel velocity sensors may be employed as a component part of a system according to the present invention.

Signals from speed sensors 14 are transmitted to control module 16. The control module operates upon data received from the wheel sensors and interacts with steering gear, 18, and hydraulic pump, 20.

Figure 2:
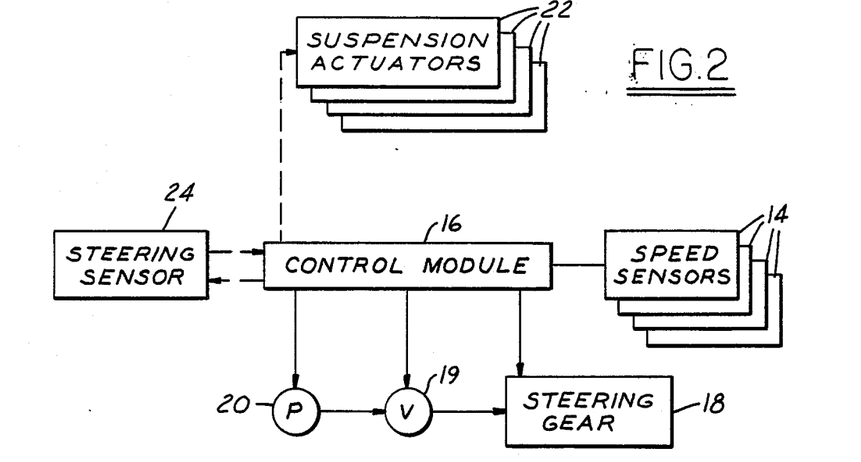
FIG. 2 is an overall system block diagram in accordance with an embodiment of this invention.

As shown in greater detail in FIG. 2, control module 16 may interact not only with speed sensors 14, steering gear 18, control valve 19, which is representative of a class of hydraulic power devices, and steering pump 20, but also with suspension actuators 22 and steering sensor 24. Examples of suspension actuators and a steering sensor are disclosed in U.S. Pat. No. 4,621,833, which is hereby incorporated by reference within this specification. U.S. Pat. No. 4,557,342, which is similarly incorporated by reference into this document, discloses a hydraulic apparatus having a valve arrangement which is representative of the type of valves suitable for use with the present invention.

The connections in FIG. 2 between control module 16 and suspension actuators 22 and steering sensor 24 are shown with dotted lines inasmuch as the present invention may be implemented to control a steering system alone without controlling a suspension actuator. Moreover, the system may be employed to control a steering gear without using a separate steering sensor. As yet another alternative, the present controller could be employed to operate one or more suspension units, without having any interaction with the steering system of the vehicle.

Figure 3:
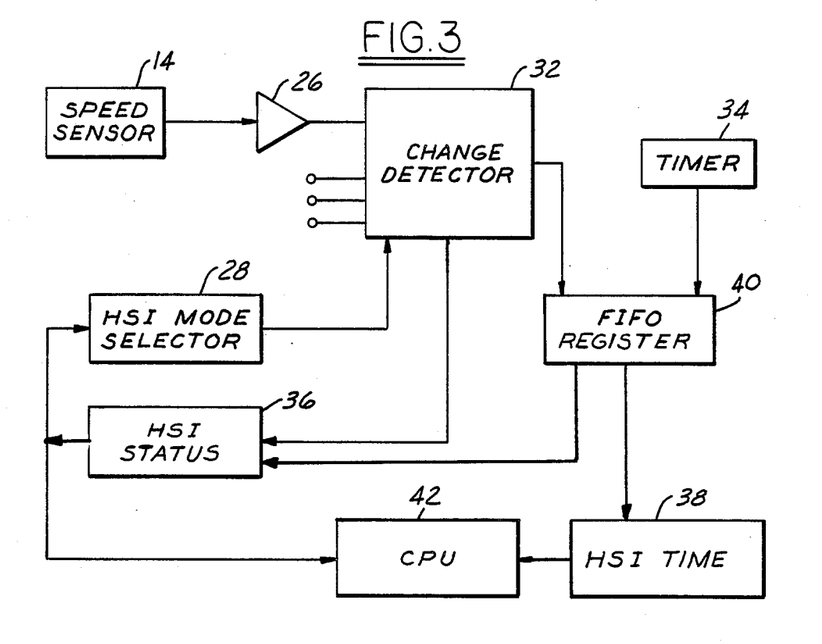
FIG. 3 is a block diagram showing a portion of a microprocessor of FIG. 2.

Processing of the signals received by control module 16 from speed sensors 14 will be explained with the aid of FIG. 3. Signals from each of the speed sensors are fed to a separate amplifier, 26, which saturates the sinusoidal output of the sensor into a square wave. Only a single sensor 14 and amplifier are shown in FIG. 3.

Those skilled in the art will appreciate in view of this disclosure that a decision to employ an amplifier in a system according to the present invention will depend upon considerations relating to the particular architecture of the system, including but not limited to the type of sensors used and the type of microprocessor. In any event, signals passing from the amplifier move to the HSI (High Speed Input) change detector 32. The change detector serves to control the amount of data impinging upon the system by indicating the occurrence of events from each particular speed sensor 14. The change detector's operation is controlled through HSI mode register 28 whose value is programmed via software through central processor 42. HSI mode register 28 dictates the condition when the value of timer 34 and the status of the change detector 32 should be stored into a recording First In, First Out Register (FIFO) 40 and alerts CPU 42 of the occurrence of the specified event by signalling an interrupt. The HSI Time Register 38 allows the CPU to accept the recorded timer 34 value from the FIFO, while HSI status device 36 allows the CPU to obtain the present and recorded change detector 32 status from the FIFO. In a preferred embodiment, change detector 32 could be directed to record the passage of every positive and negative input transition (or every zero crossing), every positive input transition (or every second zero crossing), or every eighth positive transition (or every 16th zero crossing) depending upon the frequency of the pulse train. Those skilled in the art will appreciate that the frequency of the pulse train generated by a conventional wheel velocity sensor is directly proportional to the rotational speed of the wheel.

The purpose of recording the status of change detector 32 and timer 34 upon occurrence of a specified event is to provide information about which HSI caused the recording of the change detector status and the time at which the recording was made as a time reference. When two time recordings have been made for an HSI, the input frequency calculation can be carried out in the central processor 42, which performs the calculation by taking into account the time required for a particular number of transitions, or zero crossings to be sensed by the change detector 32, the incrementing rate of timer 34 and difference between the recorded values of timer 34. This information yields a frequency value which is easily converted into wheel velocity reading.

Those skilled in the art will appreciate in view of this disclosure that central processor 42 and its associated peripheral equipment could be structured according to several of the known architectures. In a preferred embodiment, however, the processor is configured so that a control program is sequentially read from each unit command from a read-only memory (ROM), which stores preset control programs. Unit commands are executed by central processor 42. The system will also preferably comprise an Input/Output ("I/O") device, which will serve to connect the balance of the microprocessor with the other components of the system such as suspension actuators 22, steering sensor 24, speed sensors 14, and valve 19. Substantially all of the components shown in FIG. 3 with the exception of the speed sensor and amplifier 26 would be lodged within, and comprise an integral part of, a microprocessor such as the model 8096 made by the Intel Corporation.

Figure 4:
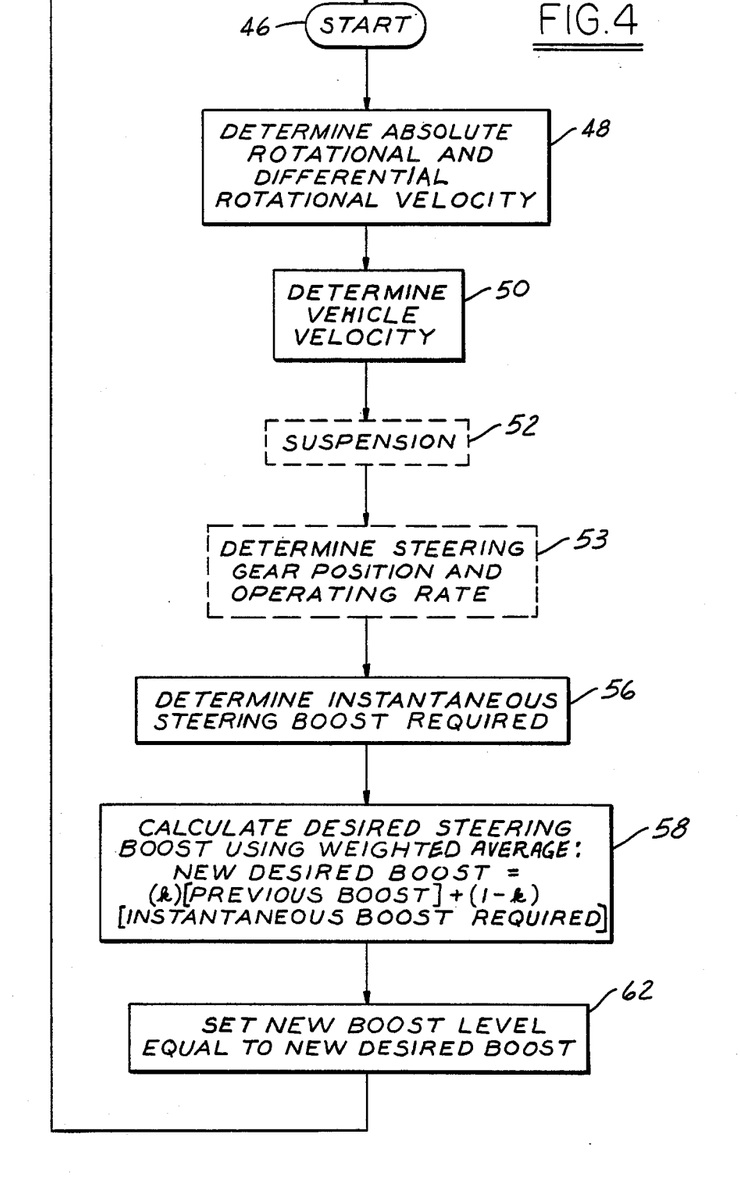
FIG. 4 is a logic flow block diagram in accordance with an embodiment of this invention.

Operation of a system according to the present invention will now be explained with reference principally to FIGS. 2 and 4. As shown in FIG. 4, the microprocessor within control module 16 begins a control sequence at start block 46. At block 48 the absolute and differential rotational velocities of the vehicle's roadwheels are determined. Depending upon the needs of the individual vehicular control system, this differential rotational velocity could comprise, for example, the greatest difference between any two of the rotational velocities and/or accelerations calculated by the microprocessor from the signals received from speed sensors 14. Alternatively, the calculated velocities of each of the wheels could be averaged arithmetically and the differential rotational velocity could be set equal to the greatest difference between said arithmetic average and each of the individual wheel speeds and/or accelerations. In any event, once the microprocessor has determined an appropriate differential rotational velocity value in block 48, the computer transfers to block 50, wherein absolute vehicle velocity is determined. This absolute vehicle velocity could comprise, for example, the arithmetic average of each of the individual wheel velocities, or some other measure of vehicle velocity.

As shown in FIG. 4, a system according to the present invention may optionally include hardware for controlling one or more suspension actuators (see FIG. 2). If such is the case, at block 52 the microprocessor will determine an appropriate suspension actuator position and move the actuator to the new position. An appropriate suspension actuator position could be based upon differential rotational velocity, or upon absolute vehicle velocity, or both. As yet another option according to the present invention, the suspension actuator could be controlled with an additional input relating to steering gear position and/or operating rate. Differential rotational velocity of the roadwheels may be employed to control the suspension units as follows. In the event, for example, that the differential rotational velocity of two wheels on the same axle or at the same end of a vehicle exceeds a predetermined threshold value, this will indicate the presence of either a turning maneuver, or some other condition in which a particular setting for suspension actuator may be desirable. Thus, higher differential rotational velocity between one or more wheels may indicate a loss of tire pressure (i.e., a blowout), in which case it may be desirable to increase or decrease either the spring force or the damping rate of the suspension unit or both. Similarly, the event that a steering gear position sensor indicates the steering gear has been rotated to such a position which will normally yield a turn, but if, for some reason the vehicle does not turn, as shown by a low magnitude differential rotational velocity, it may be desirable in this event as well to change either the spring force or damping rate or both of one or more suspension units. This type of vehicle behavior may be indicative of such conditions as an icy road, or low tire pressure, or a dragging brake, or some other abnormal condition of either the road or the vehicle.

Continuing with the main algorithm in FIG. 4, after determining the best suspension actuator positions and setting the suspension accordingly, the computer transfers to block 53 where the steering gear position, turn rate and vehicle lateral acceleration can be determined arithmetically by the microprocessor based upon the difference in rotational velocities between the right side and left side roadwheels. The program then continues to block 56 wherein the microprocessor calculates the desired instantaneous steering boost. This instantaneous steering boost value could, for example, comprise a boost value equal to a basic amount predicated upon the absolute vehicle velocity, and additive amounts based upon the determined differential rotational velocity, steering gear position, turn rate and lateral acceleration. In other words, given the forward velocity of the vehicle, a desired steering boost level may be established initially, with the initially established boost level modified according to the information determined from differential rotational velocities of the roadwheels. This will allow additional boost to be furnished in the event that differential rotational velocities reach a magnitude indicative of such maneuvers as high speed lane changing, high speed cornering, or other types of driving activity.

At block 58, the computer arithmetically averages the instantaneous required steering boost value determined in block 56 with a value which approximates the desired steering boost to be applied by pump 20 and valve 19 to steering gear 18 (FIG. 3). It has been determined that it is generally desirable to decrease steering boost as a function of time when levels of greater assist are not required. It necessarily follows that constant k (block 58) must have a value less than unity. Those skilled in the art will appreciate in view of this disclosure that constant k could comprise either a fixed numerical constant or a function such as a logarithmic or other mathematical function. By choosing an appropriate mathematical functional for k, it is possible to smoothly increase and decrease steering boost with respect to time. According to this scheme, during a highway lane change maneuver, for example, a differential rotational velocity will be produced between the left and right side roadwheels which will dictate a higher level of instantaneous steering assist for the given vehicle velocity. This instantaneous assist amount will be velocity. This instantaneous assist amount will be arithmetically averaged into value which represents the desired steering boost based on the value of k. The function which dictates the value of k will control the rate at which the steering assist will increase to the desired boost amount because of the lane change. Once the lane change is completed and the need for a higher level of assist no longer exists, the microcomputer will calculate a lower value for the required instantaneous steering assist, possibly a new value for k, and begin to decrease the desired steering boost value toward the lower value of instantaneous steering assist. During this particular maneuver, the steering assist provided by pump 20, which is controlled through value 19 will increase the rate described by the function of k and then eventually decrease at the rate described by the value of k. It should be understood that the value of k may not necessarily be constant throughout the entire maneuver.

The program flow continues to block 62 where the steering assist control actuator, valve 19, is adjusted to either increase, decrease or hold constant the amount of steering assist. After accomplishing that task, the program returns to the start block 46 of which the entire program will be repeated.

In addition to setting the boost level at blocks 60 and 62, the microprocessor may also alter the ratio of the steering system. As yet another alternative, a system recording to the present invention could be utilized to control only the ratio of the steering system. An example of a hydraulic apparatus for turning a steerable vehicle wheel at varying rates and in effect, at varying ratios, is disclosed in U.S. Pat. No. 4,557,342 which is hereby incorporated by reference within this specification. Accordingly, not only the ratio of the steering gear but also the magnitude of the augmenting force may be controlled not only as a function of differential rotational velocity but also as a function of absolute vehicle velocity.

A system according to the present invention is advantageous because it has the capability to control steering system boost and/or steering system ratio, as well as suspension unit spring force and/or damping force without the necessity of a discreet steering sensor. Because a system according to the present invention is responsive to differential wheel speed, this system will provide enhanced vehicle handling in the event that one of the tires of the vehicle deflates explosively. This enhanced handling capability results from the fact that steering boost may be increased rapidly in the event that the rolling radius of a wheel decreases rapidly (i.e., when a blowout occurs). Increased steering boost will enable the driver to control the vehicle safely. Further, at the option the system designer, the blowout phenomenon may be met with a change in the suspension unit spring rates and/or damping forces. Yet another advantage of the present invention resides in the fact that if a vehicle so-equipped is operated on a surface having multiple coefficients of friction as would be the case when the vehicle is driven either on a partially iced surface or halfway upon the shoulder of a road, the varying coefficients of friction will be revealed by differential rotational velocities of the roadwheels and the vehicle's suspension units and steering system may be adjusted accordingly in order to maintain optimum vehicle control and handling characteristics.

Various modification and variations will no doubt occur to those skilled in the arts to which this invention pertains. For example, the computer architecture described herein may be modified according to the individual needs of the system being designed. This and all other variations which basically rely on the teachings with which this disclosure has advanced art are properly considered within the scope of this invention as defined by the independent claims.

We claim:

1. A power steering system for a vehicle having two or more wheels, comprising:
    a steering gear;
    adjustment means for augmenting the steering force produced by said steering gear;
    sensing means for detecting the rotational velocities of at least two of said wheels; and
    control means, operatively associated with said sensing means and said adjustment means, comprising means for determining the differential rotational velocity between said wheels and for adjusting the steering force augmentation produced by said adjustment means when said differential velocity exceeds a predetermined threshold value, whereby the augmenting force provided by said adjustable means will be controlled as a function of said differential rotational velocity.

2. A power steering system according to claim 1 wherein said control means further comprises means for determining the rate at which said steering gear is operated and for controlling said adjustment means according to said rate, whereby the augmenting force provided by said adjustment means will be controlled not only as a function of said differential rotational velocity, but also as a function of said rate.

3. A power steering system according to claim 1 wherein said control means further comprises means for determining the position at which said steering gear is operated and for controlling said adjustment means according to said position, whereby the augmenting force provided by said adjustment means will be controlled not only as a function of said differential rotational velocity, but also as a function of said position.

4. A power steering system according to claim 1 wherein said control means further comprises means for determining the absolute velocity of said vehicle and means for operating said adjustment means according to said absolute velocity, whereby the augmenting force provided by said adjustment means will be controlled not only as a function of said differential rotational velocity, but also as a function of said absolute vehicle velocity.

5. A power steering system according to claim 4 wherein said control means further comprises means for determining the position at which said steering gear is operated and for controlling said adjustment means according to said position, whereby the augmenting force provided by said adjustment means will be controlled not only as a function of said differential rotational velocity, but also as a function of said position and said absolute vehicle velocity.

6. A power steering system for a vehicle having two or more wheels, comprising:
    hydraulic pump means;
    a hydraulic power device adapted to be connected with said hydraulic pump means so as to supply pressurized hydraulic fluid for augmenting the steering force produced by said steering system;
    sensing means for detecting the rotational velocities of at least two of said wheels; and control means, operatively associated with said sensing means and said hydraulic power device, comprising means for determining the differential rotational velocity between said wheels and for controlling said hydraulic power device in response to sensed differential velocity, whereby the augmenting force provided by said hydraulic power device will be controlled as a function of said differential rotational velocity, when said differential rotational velocity exceeds a threshold value.

7. A power steering system according to claim 6 wherein said control means further comprises means for determining the absolute velocity of said vehicle and means for operating said hydraulic power device according to said absolute velocity, whereby the augmenting force provided by said hydraulic power device will be controlled not only as a function of said differential rotational velocity, but also as a function of said absolute vehicle velocity.

8. A power steering system for a vehicle having two or more wheels, comprising:
a steering gear;
adjustment means for changing the ratio of
said steering gear; sensing means for detecting the rotational velocities of as least two of said wheels; and
control means, operatively associated with said sensing means and said adjustment means, comprising means for determining the differential rotational velocity between said wheels and for controlling said adjustment means according to said differential velocity, whereby the ratio of said steering gear will be controlled as a function of said differential rotational velocity, when said differential rotational velocity exceeds a threshold value.

9. A power steering system according to claim 8 wherein said control means further comprises means for determining the absolute velocity of said vehicle and means for operating said adjustment means according to said absolute velocity, whereby the ratio of said steering gear will be controlled not only as a function of said differential rotational velocity, but also as a function of said absolute vehicle velocity.

10. A power steering system for a vehicle having two or more wheels, comprising:
a steering gear;
adjustment means for changing the ratio of said steering gear and for augmenting the steering force produced by said steering gear;
sensing means for detecting the rotational velocities of as least two of said wheels; and
control means, operatively associated with said sensing means and said adjustment means, comprising means for determining the differential rotational velocity between said wheels and for controlling said adjustment means according to said differential velocity, whereby both the ratio of said steering gear and said augmenting force will be controlled as a function of said differential rotational velocity, when said differential rotational velocity exceeds a threshold value.

11. A power steering system according to claim 10 wherein said control means further comprises means for determining the absolute velocity of said vehicle and means for operating said adjustment means according to said absolute velocity, whereby the ratio of said steering gear and said augmenting force will be controlled not only as a function of said differential rotational velocity, but also as a function of said absolute vehicle velocity.

12. A vehicular controller for controlling both an adjustable steering gear and one or more adjustable suspension units, comprising:
first adjustment means for controlling at least one operating characteristic of said steering gear;
second adjustment means for controlling at least one operating characteristic of said suspension units;
sensing means for detecting the rotational velocities of at least two roadwheels of said vehicle; and
control means operatively associated with said first and second adjustment means as well as with said sensing means, with said control means comprising means for determining the differential rotational velocity between said roadwheels and for controlling said first and second adjustment means when said differential velocity, exceeds a threshold value.

13. A vehicular controller according to claim 12 wherein said first adjustment means comprises means for adjusting the force produced by said steering gear.

14. A vehicular controller according to claim 12 wherein said first adjustment means comprises means for adjusting the ratio of said steering gear.

15. A vehicular controller according to claim 12 wherein said first adjustment means comprises means for adjusting the force produced by said steering gear as well as the ratio of said steering gear.

16. A vehicular controller according to claim 12 wherein said second adjustment means comprises means for adjusting damping forces produced by each of said suspension units.

17. A vehicular controller according to claim 12 wherein said second adjustment means comprises means for adjusting spring forces produced by each of said suspension units.

18. A vehicular controller according to claim 12 wherein said second adjustment means comprises means for adjusting damping forces and spring forces produced by each of said suspension units.

19. A vehicular controller according to claim 12 wherein said control means further comprises means for determining the absolute velocity of said vehicle as well as means for controlling said first and second adjustment means according to said absolute velocity, whereby said steering gear and said suspension units will be controlled not only as a function of said differential rotational velocity, but also as a function of said absolute vehicle velocity.

20. A power steering system according to claim 12 wherein said control means further comprises means for determining the position at which said steering gear is operated and for controlling said first and second adjustment means according to said position, whereby said steering gear and said suspension units will be controlled not only as a function of said differential rotational velocity, but also as a function of said position.

21. A vehicular controller for controlling one or more adjustable suspension units, comprising:
adjustment means for controlling at least one operating characteristic of said suspension units;
sensing means for detecting the rotational velocities of at least two roadwheels of said vehicle; and
control means operatively associated with said adjustment means as well as with said sensing means, with said control means comprising means for determining the differential rotational velocity between said roadwheels, means for determining the absolute velocity of said vehicle and means for controlling said adjustment means according to the magnitude of said differential velocity and said absolute velocity.

22. A vehicular controller according to claim 21 wherein said adjustment means is utilized to control the damping forces produced by said suspension units.

23. A vehicular controller according to claim 21 wherein said adjustment means is utilized to control the spring forces produced by said suspension units.

* * * * *